United States Patent Office 3,506,658
Patented Apr. 14, 1970

3,506,658
2-(10-METHYL-2-PHENOXAZINYL)PROPIONIC ACID
Daniel Farge, Thiais, Claude Jeanmart, Brunoy, and Mayer Naoum Messer, Sceaux, France, assignors to Phone-Poulenc S.A., Paris, France, a French body corporate
No Drawing. Filed Apr. 17, 1967, Ser. No. 631,127
Claims priority, application France, Apr. 20, 1966, 58,342
Int. Cl. C07d 87/52; A61k 27/00
U.S. Cl. 260—244                1 Claim

ABSTRACT OF THE DISCLOSURE

Phenoxazine derivatives of the formula:

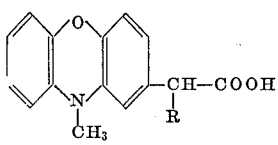

wherein R represents hydrogen, methyl or ethyl, and salts thereof, which are new compounds, have therapeutic utility as anti-inflammation and anti-rheumatic agents.

---

This invention relates to new, therapeutically useful phenoxazine derivatives, to processes for their preparation and pharmaceutical compositions containing them.

According to the present invention, there are provided the new phenoxazine derivatives of the general formula:

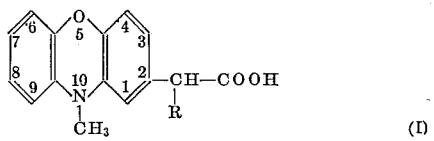

(I)

wherein R represents a hydrogen atom or a methyl or ethyl group, and salts thereof, for example alkali metal, alkaline earth metal, ammonium and amine salts. These new phenoxazine compounds possess useful pharmacodynamic properties; they are particularly useful as anti-inflammation and anti-rheumatic agents and have given good results as such in physiological experiments with animals when used in doses of 10 to 100 mg. per kilogramme of animal body weight.

According to a feature of the invention, the phenoxazine derivative of Formula I in which R represents a hydrogen atom, i.e. (10-methyl-2-phenoxazinyl)acetic acid, is prepared by the process which comprises subjecting 2-acetyl-10-methylphenoxazine of the formula:

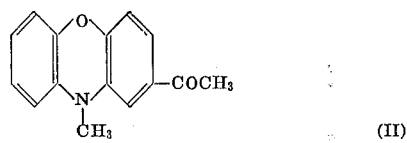

(II)

to the Willgerodt reaction or Kindler modification of it, and hydrolysing by methods known per se the amide or thio-amide thus formed.

It is particularly advantageous to subject 2-acetyl-10-methylphenoxazine to the Willgerodt-Kindler reaction using sulphur and morpholine as reagents and to operate at the reflux temperature of the reaction mixture. In this way (10-methyl-2-phenoxazinyl)acetothiomorpholide of the formula:

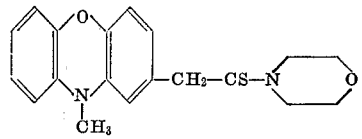

(III)

is obtained, which can be hydrolysed to (10-methyl-2-phenoxazinyl)acetic acid, preferably by treatment with potassium hydroxide.

2-acetyl-10-methylphenoxazine employed as starting material can be prepared by reacting a reactive ester of the general formula Z—CH₃ (wherein Z represents the acid residue of a reactive ester such as a halogen atom or a sulphuric acid residue, for example methoxysulphonyloxy, or sulphonic acid residue, for example methanesulphonyloxy or toluene-p-sulphonyloxy) with 2-acetylphenoxazine. This reaction is preferably carried out by heating the reactants in an organic solvent such as a lower alkanol.

2-acetylphenoxazine can be prepared according to the method of H. Vanderhaeghe, J. Org. Chem. 25, 751 (1960).

According to another feature of the invention, the phenoxazine derivatives of Formula I are prepared by the process which comprises hydrolysing by methods known per se a phenoxazine derivative of the general formula:

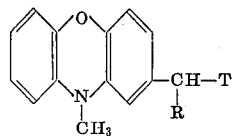

(IV)

wherein R is as hereinbefore defined, and T represents a radical known to be capable of conversion to a carboxy group by hydrolysis, such as a lower alkoxycarbonyl, cyano or a carbamoyl group. The hydrolysis is carried out under the usual conditions for the preparation of acids by hydrolysis of such precursor groups, in acid or alkaline medium as appropriate.

The phenoxazine starting materials of Formula IV can be prepared by the following methods:

(a) Reaction of a reactive ester Z—CH₃ (wherein Z is as hereinbefore defined) with a phenoxazine derivative of the formula:

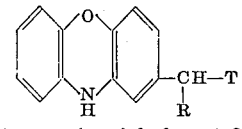

(V)

wherein R and T are as hereinbefore defined. The reaction is preferably effected by heating the reactants in an organic solvent, such as a lower alkanol, using a phenoxazine of Formula V wherein T represents an alkoxycarbonyl group.

(b) In the case of those compounds in which R represents a methyl or ethyl group and T represents an alkoxycarbonyl group, decarboxylation of a phenoxazine derivative of the general formula:

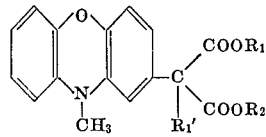

(VI)

wherein $R_1'$ represents a methyl or ethyl group, and $R_1$ and $R_2$ each represent an alkyl group containing 1 to 4 carbon atoms. The decarboxylation is effected by the usual methods for the decarboxylation of malonic esters, and is advantageously carried out with an alkali metal ethoxide as reagent.

The phenoxazine derivatives of Formula VI can be obtained by reacting a reactive ester Z—R₁' with a phenoxazinyl-malonate of the general formula:

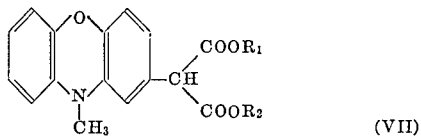

(VII)

the various symbols being as hereinbefore defined. The reaction is carried out by usual methods for the alkylation of malonic esters, i.e. by operating in the presence of a basic condensing agent such as an alkali metal alkoxide, alkali metal amide, or alkali metal, in an organic solvent such as benzene, toluene, ethanol or diethyl ether.

The phenoxazinyl-malonates of Formula VII can be obtained from phenoxazine derivatives of the formula:

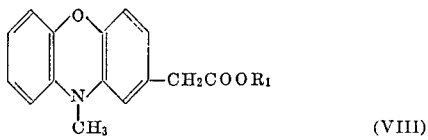

(VIII)

(wherein R₁ is as hereinbefore defined) either directly by the action of an alkyl carbonate of the formula

R₂—O—CO—O—R₂

(wherein R₂ is as hereinbefore defined) or by the action of an alkyl oxalate of the formula (COOR₂)₂, R₂ being as hereinbefore defined, followed by decarbonylation of the resultant product.

The phenoxazine derivatives of Formula VIII can be prepared by esterification of (10-methyl-2-phenoxazinyl) acetic acid.

The new phenoxazine derivatives of Formula I can be converted into metal salts or addition salts with nitrogeneous bases by application of methods known per se. Thus, these salts can be obtained by the action of an alkali metal (for example, sodium, potassium or lithium) or alkaline earth metal base, ammonia or an amine, on a phenoxazine derivative of Formula I in an appropriate solvent such as an alcohol, an ether, a ketone, or water; the salt formed is precipitated, if necessary after concentration of the solution, and is separated by filtration or decantation.

In this specification and accompanying claims the term "methods known per se" means methods heretofore used or described in the chemical literature.

For therapeutic purposes the phenoxazine derivatives of Formula I are employed as such or in the form of pharmaceutically acceptable salts, i.e. salts which are relatively innocuous to the animal organism in therapeutic doses of the salts, such as alkali metal, alkaline earth metal, ammonium and amine salts.

The following examples illustrate the invention.

EXAMPLE I

A mixture of 2-acetyl-10-methylphenoxazine (49 g.), sulphur (10.5 g.) and morpholine (100 cc.) is heated under a nitrogen atmosphere, for 18 hours. The reaction mixture is then poured into boiling ethanol (550 cc.), the resulting solution is treated with decolourising charcoal (2 g.) and filtered hot. A product crystallises on cooling. The crystals are filtered off, washed with ethanol (50 cc.) and diisopropyl ether (100 cc.) to yield (10-methyl - 2 - phenoxazinyl)acetothiomorpholide (48.8 g.) melting at 128° C.

A mixture of (10 - methyl-2-phenoxazinyl)acetothiomorpholide (48.8 g.), 85% potassium hydroxide (85 g.) and ethanol (850 cc.) is heated under reflux, under a nitrogen atmosphere, for 16 hours. The reaction mixture is evaporated to dryness under reduced pressure (20 mm. Hg) and the residue taken up in water, (250 cc.). The resulting solution is treated with decolourising charcoal (2 g.), filtered, washed with water (150 cc.) and acidified with hydrochloric acid ($d=1.19$; 130 cc.). The crystals obtained are filtered off and washed with water (300 cc.) until the washing liquor is neutral; a product (30.6 g.), melting at 178° C., is obtained and this is recrystallised from ethanol (200 cc.). The resulting product, which melts at 183° C., is recrystallised moist from ethanol (250 cc.) and a product (21.8 g.) melting at 183° C. is thus obtained. This is finally recrystallised from ethyl acetate (350 cc.) to give (10-methyl-2-phenoxazinyl) acetic acid (17.4 g.) melting at 183° C.

2-acetyl-10-methylphenoxazine used as starting material is obtained as follows:

A mixture of 2-acetylphenoxazine (56 g.), methyl iodide (112 cc.) and methanol (300 cc.) is heated at 100° C. in a silver-lined autoclave for 16 hours 30 minutes. The autoclave is cooled, degassed and the contents taken up in methylene chloride (1 litre). The resulting solution is washed with an aqueous sodium thiosulphate solution (200 g./litre; 450 cc.) and then with water (1 litre). The solution is dried over anhydrous sodium sulphate, treated with decolourising charcoal (5 g.), filtered and evaporated to dryness under reduced pressure (20 mm. Hg). A product (47.3 g.), melting at 110° C., is obtained. This is recrystallised from ethanol (110° cc.) to yield 2-acetyl-10-methylphenoxazine (41 g.) melting at 112° C.

2-acetylphenoxazine can be prepared according to the method of H. Vanderhaeghe, J. Org. Chem., 25, 751 (1960).

EXAMPLE II

A mixture of ethyl 2-(10-methyl-2-phenoxazinyl) propionate (20 g.), ethanol (142 cc.) and N sodium hydroxide solution (142 cc.) is heated under reflux for 2 hours, and then the reaction mixture is evaporated to dryness under reduced pressure (20 mm. Hg). The residue is taken up in water (200 cc.), and the solution obtained is treated with decolourising charcoal (2 g.) and then acidified with hydrochloric acid ($d=1.19$; 15 cc.). The acidified mixture is extracted with methylene chloride (400 cc.). The methylene chloride solutions are washed with water (150 cc.), dried over anhydrous sodium sulphate and evaporated to dryness under reduced pressure (20 mm. Hg). A product (17.2 g.), melting at 133° C., is obtained and recrystallised from benzene (40 cc.) to yield a product (13 g.) melting at 139° C. After a further recrystallisation from benzene (40 cc.), 2-(10-methyl-2-phenoxazinyl)propionic acid (10.6 g.), melting at 139° C. is obtained.

Ethyl 2-(10 - methyl-2-phenoxazinyl)propionate employed as starting material is prepared as follows:

A mixture of methyl ethyl methyl (10 - methyl-2-phenoxazinyl)malonate (45 g.) and an 18% solution of potassium othoxide in ethanol (60 cc.) is heated under reflux for 10 hours. The mixture is taken up in N hydrochloric acid (150 cc.) and water (50 cc.) and the resulting oil is extracted with methylene chloride (200 cc.). The methylene chloride solutions are washed with water (50 cc.), dried over anhydrous sodium sulphate, treated with decolourising charcoal (2 g.) and concentrated to dryness under reduced pressure (20 mm. Hg) to yield ethyl 2-(10-methyl-2-phenoxazinyl)propionate (34.1 g.) melting at 68° C.

The methyl ethyl methyl(10-methyl-2-phenoxazinyl) malonate is prepared in the following manner:

Methyl ethyl (10 - methyl-2-phenoxazinyl)malonate (45.7 g.) is introduced into a solution of sodium (3.7 g.) in anhydrous ethanol (500 cc.). Methyl iodide (76 g.) is then poured into this solution over a period of 20 minutes, and the mixture then kept under reflux for 10 hours. The reaction mixture is then evaporated to dryness under reduced pressure (20 mm. Hg). The residue is taken up in methylene chloride (250 cc.) and water (250 cc.). The liquid is decanted, again extracted with methylene chloride (100 cc.), and the organic solution washed with water (120 cc.), then with a 10% aqueous solution of sodium thiosulphate (200 cc.) and finally with water (120 cc.). The methylene chloride solutions are dried over anhydrous sodium sulphate, treated with decolouring charcoal (5 g.) and evaporated to dryness under reduced pressure (20 mm. Hg); a chestnut-coloured oil (47.8 g.) is obtained. This oil is dissolved in methylene chloride (100 cc.) and chromatographed on alumina (450 g.). On elution with methylene chloride a fraction (volume 1 litre) is collected and evaporated to dryness under reduced pressure (20 mm. Hg) to give methyl ethyl methyl(10-methyl-2-phenoxazinyl)malonate (45.1 g.) as an oil.

Methyl ethyl (10-methyl-2-phenoxazinyl)malonate is prepared in the following manner:

Methyl (10-methyl-2-penoxazinyl)acetate (68.1 g.) is dissolved in ethyl carbonate (260 cc.). The solution is heated to 100° C. and a solution of sodium (6.45 g.) in anhydrous ethanol (160 cc.) is poured in over a period of 150 minutes, whilst distilling ethanol at the same rate as the addition. The mixture is thereafter heated to 150° C. for 30 minutes, and the reaction mixture is then cooled and acidified with N hydrochloric acid (300 cc.). This acidified mixture is extracted with methylene chloride (300 cc.). The methylene chloride solutions are washed with water (200 cc.), dried over anhydrous sodium sulphate, treated with decolourising charcoal (5 g.) and evaporated to dryness under reduced pressure (20 mm. Hg). A brown oil (83.4 g.) is obtained. This oil is dissolved in methylene chloride (200 cc.) and chromatographed on alumina (1 kg.). On elution with methylene chloride, a fraction (volume 3 litres) is collected and evaporated to dryness under reduced pressure (20 mm. Hg). An oil (66.5 g.), which crystallises slowly, is obtained. On recrystallisation from cyclohexane (150 cc.), methyl ethyl (10-methyl-2-phenoxazinyl)malonate (45.7 g.), melting at 66° C., is obtained.

Methyl (10-methyl-2-phenoxazinyl)acetate is obtained by heating a mixture of (10-methyl-2-phenoxazinyl)acetic acid (100.2 g.), methanol (38.4 g.), 1,2-dichloroethane (120 cc.) and methanesulphonic acid (6 cc.) under reflux for 10 hours. The product is taken up in methylene chloride (200 cc.). The methylene chloride solutions are washed with water (100 cc.), 2 N ammonia (100 cc.) and finally with water (200 cc.), dried over anhydrous sodium sulphate, treated with decolourising charcoal (5 g.) and concentrated to dryness under reduced pressure (20 mm. Hg); a brown oil (102.6 g.) is obtained. This oil is dissolved in methylene chloride (200 cc.) and chromatographed on alumina (1 kg.). One elution with methylene chloride, a fraction (volume 1 litre) is collected and evaporated to dryness under reduced pressure (20 mm. Hg) to give methyl (10-methyl-2-phenoxazinyl)acetate (92.2 g.) as an oil.

The present invention includes within its scope pharmaceutical compositions containing, as active ingredient, at least one of the phenoxazine derivatives of Formula I, or a pharmaceutically-acceptable salt thereof, in association with a pharmaceutical carrier or coating. The invention includes especially such preparations made up for oral, parenteral or rectal administration or topical application, e.g. as ointments or creams.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions, when given orally, should generally be administered so as to give between 0.1 and 1.9 g. of active substance per day to an adult.

The following examples illustrate pharmaceutical compositions according to the invention.

EXAMPLE III

Tablets weighing 200 mg. and having the following composition are prepared by the usual method:

| | Mg. |
|---|---|
| (10-methyl-2-phenoxazinyl)acetic acid | 50 |
| Starch | 120 |
| Colloidal silica | 27 |
| Magnesium stearate | 3 |

EXAMPLE IV

Tablets weighing 500 mg. and having the follow composition are prepared by the usual method:

| | Mg. |
|---|---|
| 2-(10-methyl-2-phenoxazinyl)propionic acid | 250 |
| Starch | 190 |
| Colloidal silica | 50 |
| Magnesium stearate | 10 |

We claim:
1. 2-(10-methyl-2-phenoxazinyl)propionic acid.

References Cited

Chem. Abst., vol. 60, Subject Index (J–Z) page 1949S (January–June 1964).

Vanderhaeghe Jour. Org. Chem., vol. 25, pp. 747–53 (1960).

HENRY R. JILES, Primary Examiner

N. TROUSOF, Assistant Examiner

U.S. Cl. X.R.

260—247.1; 424—248